United States Patent
Cofer et al.

(10) Patent No.: US 11,072,743 B1
(45) Date of Patent: Jul. 27, 2021

(54) FIRE RESISTANT MATERIALS BASED ON ENDOTHERMIC ALUMINA-SILICA HYDRATE FIBERS

(71) Applicants: Savannah Ashley Cofer, Gahanna, OH (US); Varun Venkat Vallabhaneni, Gahanna, OH (US)

(72) Inventors: Savannah Ashley Cofer, Gahanna, OH (US); Varun Venkat Vallabhaneni, Gahanna, OH (US)

( * ) Notice: Subject to any disclaimer, the term of this patent is extended or adjusted under 35 U.S.C. 154(b) by 648 days.

(21) Appl. No.: 15/369,773

(22) Filed: Dec. 5, 2016

Related U.S. Application Data

(60) Provisional application No. 62/263,337, filed on Dec. 4, 2015.

(51) Int. Cl.
*C09K 21/02* (2006.01)
*D01F 9/08* (2006.01)
*D04H 18/02* (2012.01)

(52) U.S. Cl.
CPC .............. *C09K 21/02* (2013.01); *D01F 9/08* (2013.01); *D04H 18/02* (2013.01)

(58) Field of Classification Search
USPC ........................................... 8/442, 137, 532
See application file for complete search history.

(56) References Cited

U.S. PATENT DOCUMENTS

| | | | | |
|---|---|---|---|---|
| 4,101,615 A | * | 7/1978 | Horikiri | C04B 35/62231 264/627 |
| 4,500,320 A | * | 2/1985 | Grunert | C01B 33/2815 8/442 |
| 2011/0126957 A1 | * | 6/2011 | Wierzbicki | B32B 5/26 156/60 |
| 2011/0248420 A1 | * | 10/2011 | Cordts | D04H 1/4209 264/115 |

* cited by examiner

*Primary Examiner* — Lynda Salvatore
(74) *Attorney, Agent, or Firm* — Michael D. Eisenberg

(57) ABSTRACT

An alumina-silica hydrate fiber for thermal protection in the most hazardous environments experienced by firefighters. The fiber has a combination of heat resistance at temperatures above 1,000° C. and an endothermic behavior when heated. Its endothermic condensation reaction releases up to 12% water upon heating, thereby contributing to the thermal insulating properties. The fibers are extremely soft to the touch and do not irritate the skin. They are also non-respirable in the deep lung, so they can be used safely without risk of inhalation. The fabric is sufficiently lightweight and flexible as well, allowing firefighters to move easily. These properties of alumina-silica hydrate fibers enable their use for apparel.

14 Claims, 4 Drawing Sheets

FIRE RESISTANT MATERIALS BASED ON ENDOTHERMIC ALUMINA-SILICA HYDRATE FIBERS

CROSS-REFERENCES TO RELATED APPLICATIONS

This application claims priority from U.S. Provisional Application Ser. No. 62/263,337 filed Dec. 4, 2015, which is hereby incorporated herein by reference in the respective in its entirety.

TECHNICAL FIELD

The present invention relates to endothermic inorganic fibers and applications related to their use as a thermal barrier.

BACKGROUND OF THE INVENTION

Personal protective equipment is critical to keeping firefighters safe against dangerous high temperature conditions. However, current materials used in firefighter apparel have extremely limited durability, especially under intense flash fire conditions. This apparel is presently comprised of aramid fabrics and nonwovens that char, lose structural integrity, and quickly lose their ability to insulate at temperatures above 300° C. Inspired by the technology behind an instant ice pack, the present invention offers an alternative material based on a high temperature endothermic fiber that provides superior resistance at elevated temperatures, while meeting the broad performance requirements of this industry. Specifically, we have developed thermally insulating constructions based on alumina-silica hydrate fibers that have been shown to provide high temperature resistance based on their inorganic, endothermic composition that absorbs heat at elevated temperatures.

We began our investigation by researching a variety of materials, both organic and inorganic, that had the potential to improve the safety of the firefighter. By evaluating the key properties of each fiber, we were able to gain a broad understanding of the application requirements and the limitations of currently available textile materials. Table 1 below, summarizes property values for various materials and coded with symbols @, or, $ for: meeting design criteria (having a @), some being close to meeting design criteria (having a #), and some meeting or exceeding design criteria (having a $).

The above summary reveals that the only material that meets or exceeds all of the design criteria is the inorganic endothermic fiber.

While endothermic chemistries are currently used in other material forms, there is no prior art for their use in the form of textile fibers. The present invention represents a unique material combined with a unique set of applications. Nonwoven apparel were prepared via a needle felt process. Nonwoven alumina-silica hydrate fibers were made with basis weights ranging from 90 to 200 g/m2. These materials exhibited significantly higher durability than current fire retardant aramid fibers, as they could withstand temperatures over 1,000° C. without degradation.

Moreover, when formed into a fire protective suit, the material could protect the firefighter in conditions in which aramid materials would rapidly oxidize and break down in less than one minute. Woven fabrics and hybrid constructions based on alumina-silica hydrate fibers were also prepared. These materials satisfied a demanding set of criteria required for high temperature apparel: High temperature resistance; Excellent durability; Lightweight and flexible; Non-irritating to the skin; Zero health risks; and Cost savings as compared to current aramid materials In these fabrics, the alumina-silica hydrate fiber exhibited a strong endotherm at 100-150° C. where heat was absorbed upon heating. This endotherm corresponds to a condensation reaction with corresponding evolution of water. A smaller endotherm also was present between 400 and 1,000° C. Fabrics were made into fire resistant apparel to demonstrate their capability to dramatically outperform the industry standard aramid fabrics. Hybrid constructions combining aramid fibers with alumina-silica hydrate fibers were also produced and shown to offer superior performance.

The alumina-silica hydrate fiber (and similar endothermic high temperature fibers) described in this invention can be used in a wide range of applications that must withstand high temperatures without experiencing thermal degradation. Additional applications include fire blankets, fire wraps for buildings, industrial fire protective suits and even fabrics for consumer products

BRIEF SUMMARY OF EMBODIMENTS OF THE INVENTION

Experimental testing and analysis have demonstrated that this novel alumina-silica hydrate fiber has the potential to

| Material | Thermal Resistance | Durability | Light/Flexible | Irritation to Skin | Health Risks | Cost |
|---|---|---|---|---|---|---|
| Aramid (Kevlar/Nomex) | <300 C. @ | Excellent abrasion resistance $ | Yes $ | Modest # | None $ | High @ |
| PEEK (ZYEX) fiber | <250 C. @ | Modest # | Yes $ | None $ | None $ | High @ |
| PTFE (Teflon) fiber | <250 C. @ | Excellent $ | Yes $ | None $ | None $ | Low $ |
| Carbon Fiber | <500 C. # | Poor @ | Yes $ | Itchy @ | None $ | Modest # |
| E-glass Fiber | <600 C. $ | Modest # | Yes $ | Itchy @ | None $ | Low $ |
| S-glass Fiber | <700 C. $ | Modest # | Yes $ | Itchy @ | None $ | Modest # |
| RCF (refractory ceramic fiber) | <1,200 C. $ | Poor @ | Yes $ | Itchy @ | Class 2 Carcinogen @ | Low $ |
| 3M Nextel(r) Mullite | <1,200 C. $ | Modest # | Yes $ | Itchy @ | Modest # | Extremely High @ |
| Mitsubishi Maftec(r) Mullite Fiber | <1,600 C. $ | High $ | Yes $ | Itchy @ | Yes $ | Extremely High @ |
| Inorganic Endothermic Fiber | <1,100 C. $ | High $ | Yes $ | None $ (Feels soft like cotton) | Yes $ | Modest # | greatly improve thermal protection in the most hazardous environments experienced by firefighters. Its unique chemistry offers a combination of heat resistance at temperatures above 1,000° C. and an endothermic behavior when heated. Its endothermic condensation reaction releases up to 12% water upon heating, thereby contributing to the thermal insulating properties. In contrast to aramid fibers, which char and rapidly degrade in flashover conditions, the alumina-silica hydrate fiber appears pristine even after heating to 1,000° C.

Nonwoven materials comprised of alumina-silica hydrate could therefore be successfully used as a replacement for nonwoven aramid fibers in the inner layer of turnout gear. The incorporation of endothermic fibers could truly revolutionize the industry by providing a dramatic increase in protection for the firefighter in the most dangerous circumstances.

The alumina-silica hydrate fibers studied here also have a unique combination of properties needed for firefighter apparel. These fibers are extremely soft to the touch and do not irritate the skin. They are also non-respirable in the deep lung, so they can be used safely without risk of inhalation. The fabric is sufficiently lightweight and flexible as well, allowing firefighters to move easily. These properties of alumina-silica hydrate fibers enable their use for apparel.

In a variant, a material resistant to burning, comprises a plurality of textile fibers comprised of an inorganic endothermic compound.

In another variant of the material resistant to burning, the inorganic endothermic compound is alumina-silicate hydrate.

In a further variant of the material resistant to burning, the inorganic endothermic compound is a hybrid of alumina-silicate hydrate and aramid polymer.

In yet another variant of the material resistant to burning, the plurality of textile fibers is woven together by a needle felt process.

In still a further variant of the material resistant to burning, the plurality of textile fibers has a basis weight of 90-200 g/m$^2$.

In another variant of the material resistant to burning, the inorganic endothermic compound is comprised of, by weight: 70-95% SiO2; 1-20% Al2O3; and 5-15% H2O.

In a further variant of the material resistant to burning, the inorganic endothermic compound is comprised of, by weight: 70-95% SiO2; 1-20% Al2O3; 1-10% TiO2; and 5-15% H2O.

In yet another variant of the material resistant to burning, the inorganic endothermic compound is comprised of, by weight: 70-95% SiO2; 1-20% Al2O3; 1-10% MgO; and 5-15% H2O.

A method of making a plurality of textile fibers comprised of an inorganic endothermic compound, comprises the steps of: drawing a plurality of oxide fibers, containing a plurality of alkali oxide groups, continuously at a temperature greater than 1350° C.; and placing the plurality of oxide fibers into an acidic solution, to create an ion exchange reaction, wherein the plurality of alkali oxide groups of the plurality of oxide fibers are replaced by a plurality of hydroxide groups.

In a variant of the method of making a plurality of textile fibers, the plurality of oxide fibers contains up to 35% alkali content.

In another variant of the method of making a plurality of textile fibers, the plurality of textile fibers is resistant to burning.

In a further variant of the method of making a plurality of textile fibers, the plurality of textile fibers is comprised of alumina-silicate hydrate.

In yet another variant of the method of making a plurality of textile fibers, the plurality of textile fibers is comprised of a hybrid of alumina-silicate hydrate and aramid polymer.

In still a further variant of the method of making a plurality of textile fibers, the plurality of textile fibers is woven together by a needle felt process.

In another variant of the method of making a plurality of textile fibers, the plurality of textile fibers has a basis weight of 90-200 g/m$^2$.

In a further variant of the method of making a plurality of textile fibers, the plurality of textile fibers is comprised of, by weight: 70-95% SiO2; 1-20% Al2O3; and 5-15% H2O.

In yet another variant of the method of making a plurality of textile fibers, the plurality of textile fibers is comprised of, by weight: 70-95% SiO2; 1-20% Al2O3; 1-10% TiO2; and 5-15% H2O.

In still a further variant of the method of making a plurality of textile fibers, the plurality of textile fibers is comprised of, by weight: 70-95% SiO2; 1-20% Al2O3; 1-10% MgO; and 5-15% H2O.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
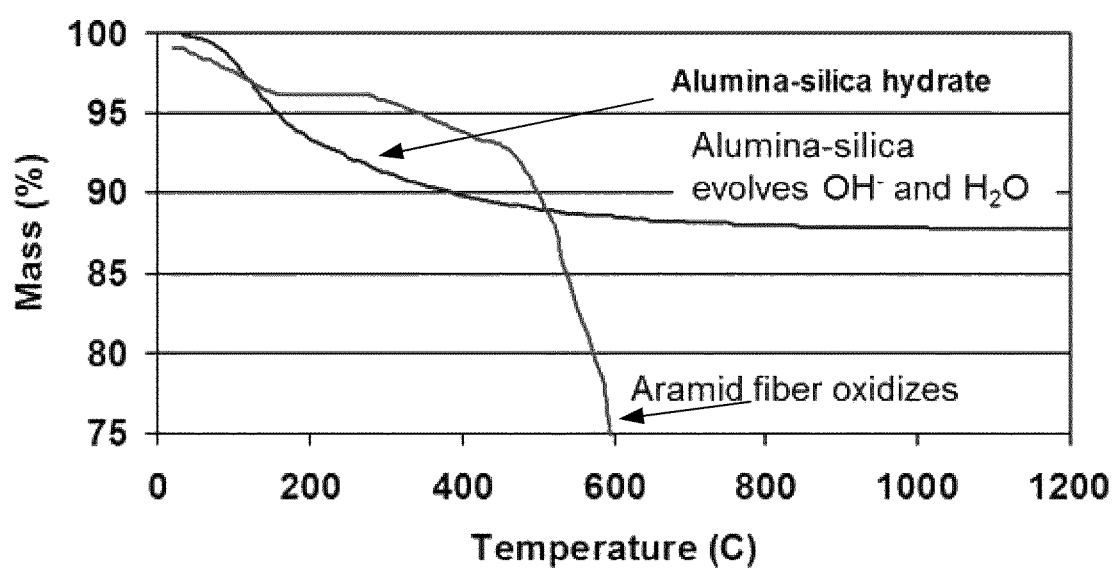
FIG. 1 is a graph of a thermogravimetric analysis (TGA) of alumina-silica hydrate and aramid fibers.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present invention provides a unique fibrous construction that absorbs thermal energy upon heating. Inorganic oxide fibers are produced in a hydrated form so that hydroxyl groups are released upon heating. A range of oxide chemistries can be used to achieve this endothermic behavior upon heating.

Unlike dispersed endothermic particulates as described in U.S. Pat. No. 6,341,384 the present invention claims fibers which are themselves endothermic, providing a much more robust system. The present invention is also significant improvement upon U.S. Pat. No. 7,259,117 in which the fibers are organic and subject to oxidation at temperatures above 350 C. The present invention is also distinguished from CN201997011U, which describes a layered structure using removable, yet conventional flame retardant fabrics.

An advantage of the present invention is that the endothermic material itself is produced into a fibrous form, rather than sheets or powders. High temperature resistant fibers with endothermic behavior have never before been achieved.

The present invention covers a wide variety of inorganic endothermic fibers including the following examples (percentages are by weight):

$SiO_2(70-95\%).Al_2O_3(1-20\%).H_2O(5-15\%)$ $SiO_2(70-95\%).Al_2O_3(1-20\%).TiO_2(1-10\%).H_2O(5-15\%)$ $SiO_2(70-95\%).Al_2O_3(1-20\%).MgO(1-10\%).H_2O(5-15\%)$

In order to achieve these unique chemistries, oxide fibers are first produced by continuous drawing at high temperatures in excess of 1350 C. Fibers are drawn using compositions containing alkali oxides with alkali oxide content up to 35%. Following drawing, an ion exchange reaction is performed in an acidic solution thereby replacing the alkali oxides with hydroxyl groups. This ion exchange reaction results in a very unusual fiber with unique characteristics.

Due to its unique chemistry in its as-produced state, the hydroxyl containing oxide fiber feels more like a polymeric fiber than a ceramic fiber, thereby meeting the requirement of comfort when made into a wearable garment. Similar to current aramid fibers, the alumina-silica hydrate fiber is both flexible and lightweight.

Extensive analysis has been performed on fibers produced in the silica-alumina hydrate composition.

Thermogravimetric analysis (TGA) was used to examine how the sample fibers changed when exposed to high temperatures. The comparison between the aramid fiber and the alumina-silica hydrate is shown in FIG. 1, demonstrating a marked difference in the high temperature behavior of the industry standard aramid fiber versus the alumina-silica hydrate fiber. The nonwoven aramid fiber shown is the most commonly used material for the inner thermal lining of firefighter turnout gear. It is a blend of 60% meta-aramid and 40% para-aramid. In the figure, the aramid material exhibits rapid oxidation above 300° C., with the sample appearing completely charred by 400° C.

During isothermal heating, the meta-aramid fiber charred completely in 30 seconds at 350° C. When heated at 600° C., 80% of its mass was lost in 20 minutes. This mass loss reflects the ability of the meta-aramid fiber to char rather than melt or completely oxidize. This behavior is useful for the less extreme fire conditions outlined in FIG. 1. However, upon exposure to extreme or critical conditions, the aramid fibers rapidly oxidize. This excessive loss of mass at temperatures above 400° C. would therefore be catastrophic under flashover conditions.

In contrast, the alumina-silica hydrate fiber exhibited a gradual mass loss which began at 60-100° C. (FIG. 1) and continued through 700° C. During this temperature increase, the alumina-silica hydrate fiber lost approximately 12% mass. This mass loss corresponds to a condensation reaction in which hydroxyl ions are evolved, combining to form H2O. Minimal mass loss was observed from 800-1,200° C., upon completion of the condensation reaction and the resulting stabilization of the alumina-silica matrix. The resultant fiber sample was much stiffer than the initial as-produced fiber, but it could still be flexed without fracture and therefore remained intact even up to 1,200° C.

One characteristic that sets apart the alumina-silica hydrate fiber is its soft feel. Other inorganic fibers that can endure temperatures of 1,000° C. are itchy, respirable into the deep lung, or both. Such ceramic fibers are unsuitable candidates for firefighter apparel. Therefore, the combination of durability and softness (even softer than meta-aramid or PBI) suggest that the alumina-silica hydrate fiber has great potential for use in fire-resistant protective apparel.

Differential Scanning Calorimetry (DSC)

Figure 2:
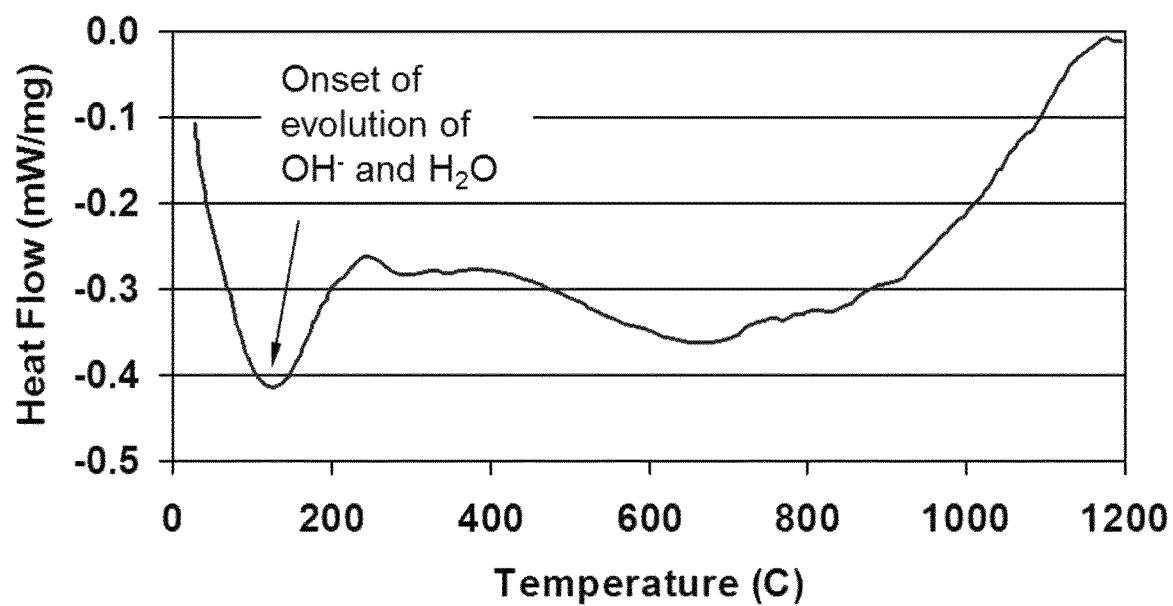
FIG. 2 is a graph of a differential scanning calorimetry (DSC) of alumina-silica hydrate fibers showing endothermic condensation reaction.

Both alumina-silica hydrate and aramid fibers were tested using Differential Scanning calorimetry (DSC). FIG. 2 is a DSC graph of alumina-silica hydrate fibers showing endothermic condensation reaction. The aramid fibers exhibited exothermic behavior, as expected from any polymeric fiber that is oxidizing. In contrast, the alumina-silica hydrated fiber had a strong endotherm at 100-150° C. (FIG. 2). A smaller endotherm also was present between 400 to 1,000° C. A strong endotherm at 100-150° C. corresponds to the condensation reaction in which water is released. It is this unique ability to absorb heat when exposed to elevated temperature that provides extra benefit when applied as a heat resistant material. It is important to note, however, that this condensation reaction only occurs during the first heating of the material. It is an irreversible reaction, so subsequent heat exposure does not repeat this endotherm.

Vertical Flame Test

The vertical flame test of ASTM D6412 was used to compare alumina-silica hydrate fibers (on the right side of FIG. 3) to several different aramid woven and nonwoven materials which are currently used in turnout gear. After a 12 second exposure to a vertical methane flame at approximately 700° C., the aramid fabrics and nonwovens had a char length which ranged from 50-80 mm in length (on the left side of FIG. 3). At the most severe portion of the char, the fibers were so brittle that they tore under almost zero load. For the most common 60/40 meta-aramid/para-aramid quilted nonwoven, referring to FIG. 3, the char length was 21 mm with a 0.23 kg load. This charring behavior does prevent the aramid fiber from completely melting at low temperatures like other common polymeric materials. However, the fiber quickly becomes extremely weak, even losing its ability to maintain its distinct identity of individual filaments. This low tensile strength after heat exposure reveals its limitations in providing protection for more than 12 seconds.

Figure 3:
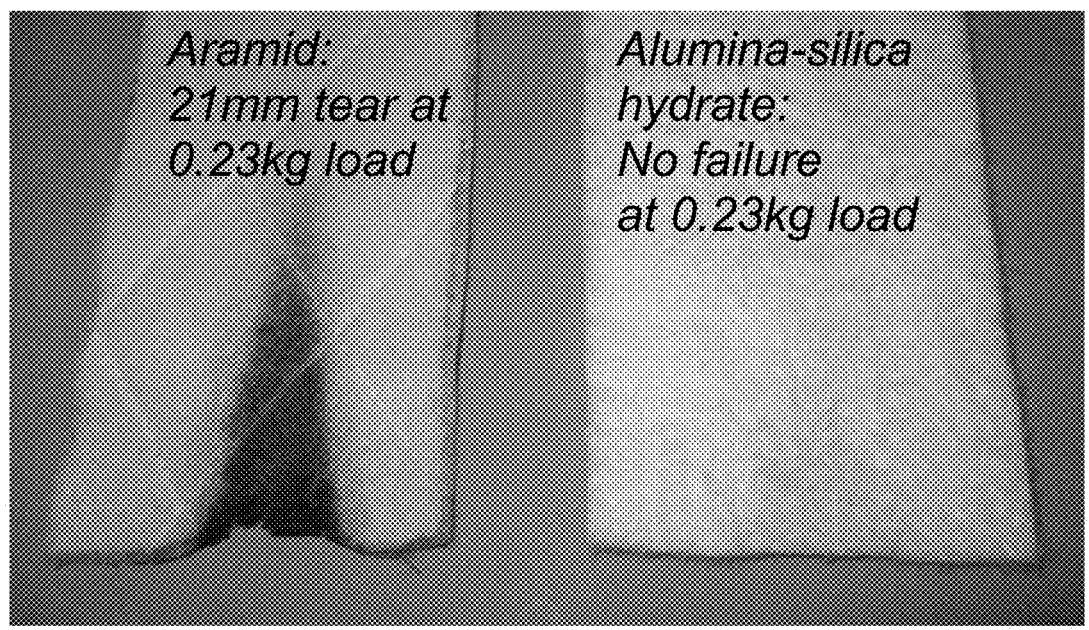
FIG. 3 is a comparison between nonwoven 60%/40% aramid and alumina-silica hydrate after vertical flame test with loading.

In contrast, referring to the right side of FIG. 3, both the woven and nonwoven alumina-silica hydrate materials showed no visible charring after enduring the same vertical flame test and remained completely white in color. Under the same loading of 0.23 kg, zero tearing was observed. Even under close inspection, no visible changes were observed in these materials after being exposed by the 700° C. vertical flame.

Single Filament Tensile Test

Figure 4:
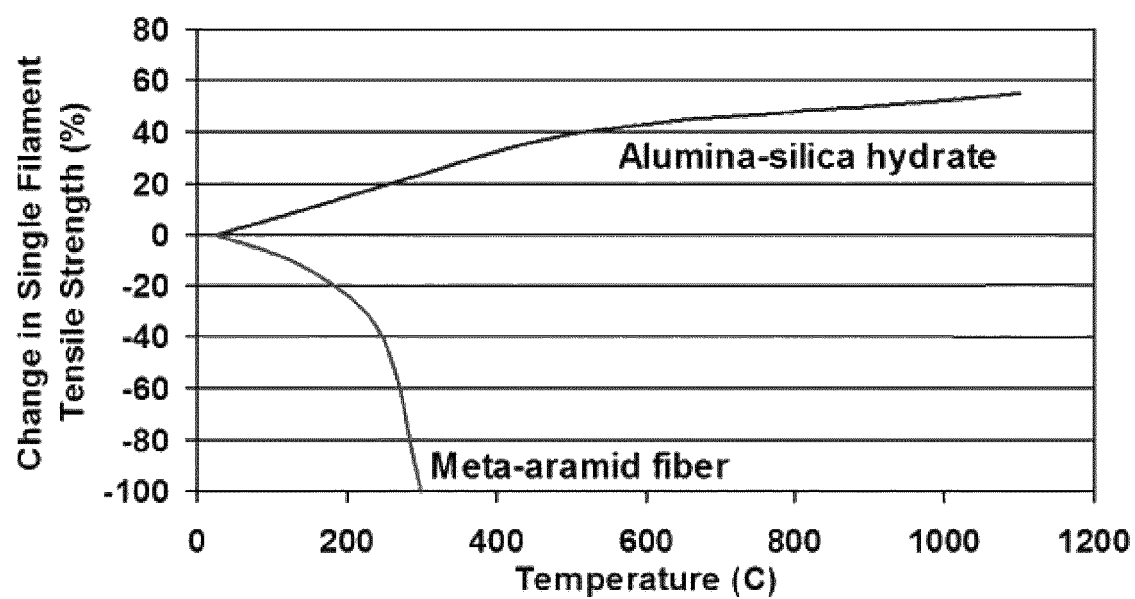
FIG. 4 is a graph of the relative change in single filament tensile strength versus temperature.

Tensile strengths were evaluated on meta-aramid and alumina-silica hydrate fibers as shown in FIG. 4, highlighting the drastic chemical and physical differences between the materials. FIG. 4 is a graph of the relative change in single filament tensile strength of each fiber upon heating. The meta-aramid fibers exhibited loss of strength with increasing temperature, mainly due to its rapid char formation and oxidation. Strength loss accelerated dramatically above 200° C., with fiber strength becoming negligible by 300° C.

In contrast, the alumina-silica hydrate fiber strength actually increased with temperature. In fact, the fiber strength increased by 40% of its original strength by 500° C., and by 50% after reaching 600° C. This remarkable behavior occurs because of the condensation reaction and stabilization of the alumina-silica matrix. The fiber transforms to more of a ceramic fiber which is both stiffer and stronger.

What is claimed is:

1. A material resistant to burning, comprising a plurality of textile fibers, in which the fibers themselves are formed of an inorganic endothermic compound, wherein the fibers consist of the inorganic endothermic compound consisting of alumina ($Al_2O_3$)-silicate ($SiO_2$) hydrate ($H_2O$) and a metal oxide, such that $Al_2O_3$, $SiO_2$, and $H_2O$ combine to form Si—(OSi)3OH, wherein Si—(OSi)3OH is a condensation product resulting in endothermic behavior in response to elevating temperatures.

2. The material of claim 1, further comprising aramid polymer fibers.

3. The material of claim 1, wherein the plurality of textile fibers is woven together by a needle felt process.

4. The material of claim 1, wherein the plurality of textile fibers has a basis weight of 90-200 g/m².

5. The material of claim 1, wherein the alumina-silicate hydrate and the metal oxide of the fibers contain:
70-95% $SiO_2$ by weight;
1-20% $Al_2O_3$ by weight; and
5-15% $H_2O$ by weight.

6. The material of claim 1, wherein the alumina-silicate hydrate and the metal oxide of the fibers contain:
70-95% $SiO_2$ by weight;
1-20% $Al_2O_3$ by weight;
1-10% $TiO_2$ by weight; and
5-15% $H_2O$ by weight.

7. The material of claim 1, wherein the alumina-silicate hydrate and the metal oxide of the fibers contain:
70-95% $SiO_2$ by weight;
1-20% $Al_2O_3$ by weight;
1-10% MgO by weight; and
5-15% $H_2O$ by weight.

8. The material of claim 5, wherein OH is chemically bound within the fibers as Si—(OSi)3OH.

9. The material of claim 1, wherein the condensation product results from release of hydroxide and water.

10. The material of claim 7, wherein OH is chemically bound within the fibers.

11. The material of claim 1, alumina-silicate hydrate and the metal oxide of the fibers contain:
70-95% $SiO_2$ by weight;
1-20% $Al_2O_3$ by weight; and
5-15% $H_2O$ by weight; and
wherein the fibers are formed with chemically bound hydroxyl groups.

12. The material of claim 1, wherein the alumina-silicate hydrate form a structural basis from which a chemically bound OH group is derived.

13. The material of claim 1, wherein the endothermic profile comprises a first endotherm and a second endotherm, wherein the first endotherm is irreversible and occurs between 100° C. and 150° C.

14. A material resistant to burning, comprising a plurality of textile fibers, whereby an inorganic endothermic compound consisting of alumina ($Al_2O_3$)-silicate ($SiO_2$) hydrate ($H_2O$) is integrated into the plurality of textile fibers and a condensation product chemically attached to the inorganic endothermic compound.

* * * * *